United States Patent [19]
Masumoto et al.

[11] Patent Number: 4,745,806
[45] Date of Patent: * May 24, 1988

[54] LEVEL GAUGE FOR LIQUID HELIUM

[75] Inventors: Tsuyoshi Masumoto, Sendai; Uichiro Mizutani, Nagoya; Masami Ishii, Toyota; Hiroshi Motoyama, Toyota; Ryohei Yabuno, Toyota; Tetsuo Oka, Toyoake, all of Japan

[73] Assignee: Aisin Seiki Kabushiki Kaisha, Kariya, Japan

[*] Notice: The portion of the term of this patent subsequent to Apr. 7, 2004 has been disclaimed.

[21] Appl. No.: 822,110

[22] Filed: Jan. 24, 1986

[51] Int. Cl.$^4$ .................. G01F 23/24; C22C 16/00; H01B 1/02; H01B 12/00
[52] U.S. Cl. ...................... 73/295; 73/290 R; 73/304 R; 420/901
[58] Field of Search ............. 73/295, 304 R; 374/176; 148/403; 420/422, 901; 338/325

[56] References Cited

U.S. PATENT DOCUMENTS

| | | | |
|---|---|---|---|
| 3,085,433 | 4/1963 | Shmueli | 73/295 |
| 3,436,713 | 4/1969 | Noia | 374/176 |
| 3,496,773 | 2/1970 | Cornish | 73/295 |
| 3,856,513 | 12/1974 | Chen et al. | 374/176 |
| 3,943,767 | 3/1976 | Efferson | 73/295 |
| 4,118,984 | 10/1978 | Kuraoka et al. | 73/295 |
| 4,517,253 | 5/1985 | Rose et al. | 428/684 |
| 4,564,396 | 1/1986 | Johnson et al. | 148/127 |
| 4,566,323 | 1/1986 | Masumoto et al. | 73/295 |
| 4,655,079 | 4/1987 | Masumoto et al. | 73/295 |

FOREIGN PATENT DOCUMENTS

| | | | |
|---|---|---|---|
| 0093024 | 6/1980 | Japan | 73/304 R |
| 0016820 | 2/1981 | Japan | 73/304 R |
| 0103324 | 8/1981 | Japan | 73/304 R |
| 0164924 | 12/1981 | Japan | 73/295 |

Primary Examiner—William A. Cuchlinski, Jr.
Assistant Examiner—Thomas B. Will
Attorney, Agent, or Firm—Oblon, Fisher, Spivak, McClelland & Maier

[57] ABSTRACT

A level gauge for liquid helium suitable for use under a higher vapor pressure comprising a sensing element in the form of a ribbon wire made of superconductive alloys and a tube supporting the sensing element which tube is inserted into liquid helium upon measurement. Chemical composition of the superconductive alloys are represented by a formula, $Zr_{100-x}(Ru_{1-y}Rh_y)_x$, in which x represents a content of Ru and/or Rh in atomic % and in a numerical value of $17.0 \leq x \leq 22.5$ and y represents a numerical value of $\leq y \leq 1$. The alloys are made of an amorphous phase obtained by rapid quenching of a molten alloy material and have a superconducting transition temperature, Tc, of 4.5° to 5.2° K. When the level gauge is immersed in liquid helium, a portion of the sensing element below the level of the liquid helium has a zero electric resistance because of the superconductivity of the alloy, so that the level of the liquid helium can be detected by a variation in resistance of the sensing element.

2 Claims, 3 Drawing Sheets

LEVEL GAUGE FOR LIQUID HELIUM

BACKGROUND OF THE INVENTION

1. Field of the Invention

This invention relates to a level gauge for detecting a level of liquid helium which is accomodated in a container made of metals, glasses or other materials. More particularly, the invention relates to a level gauge for detecting a level of liquid helium which makes use of, as a sensing element, a wire made of an amorphous superconductive alloy obtained by rapid quenching of a molten alloy material and in which the level of liquid helium is detected by measurement of an electric resistance of the sensing element.

2. Description of the Prior Art

Masumoto and Inoue disclosed, in Japanese Patent Application No. 57-049911 filed Mar. 26, 1982 and now laid-open in Japanese Laid-open Patent Application Gazette No. 58-166220, level gauges which make use of wires, made of amorphous superconductive alloys, as sensing elements in order to detect a level of liquid helium.

The amorphous superconductive alloys used to make the sensing elements of the level gauge are alloys which are obtained by rapid quenching of molten alloy materials and which comprise 20% by volume or more of an amorphous phase and whose superconducting transition temperature, Tc, ranged from 4.2 to 5.0° K. The alloys are represented by the general formula, $Z_a.M_b.(Q+Al)_c$, in which Z is a member selected from the group consisting of Zr, Hf and Ti, M is a member selected from the group consisting of V, Nb and Ta, Q is Si or Ge, a is a value of 10 to 90 atomic %, b is a value of less than 80 atomic %, and c is a value of 10 to 25 atomic %.

The level gauge disclosed in the above patent application utilizes a wire sensing element of the superconductive alloys. The level gauge is attached to a container in such a way that the sensing element is vertically disposed into liquid helium accomodated in the container. The level of the liquid helium is detected as follows: the sensing element is connected to a D.C. power supply at opposite ends thereof and applied with a small electric current to measure a variation of an electric resistance of the element.

Of the amorphous superconductive alloys represented by the above general formula, $Z_a.M_b.(Q+Al)_c$, have the following problems to be solved when applied as wire sensing element of a level gauge. Because of the addition of Nb to Zr which is a main ingredient of the superconductive alloy of the above formulation, the melting temperature of the alloy becomes very high, i.e. about 1800° C., so that specific types of equipments or apparatus are needed to melt the alloy.

In the U.S. Patent Application Ser. No. 06/673,931 now U.S. Pat. No. 4,655,079 of Masumoto et al, filed Nov. 21, 1984, there is described a level gauge for liquid helium which includes a sensing element made of a superconductive alloy wire which has a superconducting transition temperature, Tc, of 4.2 to 4.5° K., a support member for linearly supporting and dielectrically insulating the sensing element, means for energizing the sensing element and means for detecting a current passed through the sensing element. The superconductive alloy consists essentially of Zr, Ru and Rh which are represented by the following formula, in which x represents a content of at least one of Ru and Rh in atomic % and is in the range of $22.5 \leq x \leq 27.5$ and y is a value of $0 \leq y \leq 1$. The superconductive alloy has an amorphous phase which is obtained by rapid quenching of a molten alloy material and whose maximum transition temperature, Tc, is about 4.5° K.

In FIG. 1, there is shown the relationship between the temperature of liquid helium and the vapor pressure. As will be seen from the graph, the temperature of liquid helium increases with an increase of the pressure (vapor pressure). At about 1.3 bars or higher, the temperature of liquid helium is higher than 4.5° K. This means that the sensing element made from the above superconductive material does not exhibit the superconducting transition in liquid helium at a pressure over 1.3 bars. Therefore, a level gauge using the sensing element cannot be applied to a container accomodating liquid helium in an atmosphere where the pressure is over 1.3 bars. In other words, the level gauge cannot be used as a gauge for monitoring the level of liquid helium at the time when liquid helium is transferred using the container or is charged into the container. As will be clearly seen from FIG. 1, the critical temperature of liquid helium is 5.2° K., i.e. the temperature at which helium can be liquid is below 5.2° K. Accordingly, there is a demand of a level gauge for liquid helium which has a sensing element made from a superconductive material having superconducting transition temperature of from 4.5° of 5.2° K.

SUMMARY OF THE INVENTION

A primary object of the present invention is to provide a level gauge which makes use of a sensing element made of superconductive alloys which has a superconducting transition temperature, Tc, ranging from 4.5° to 5.2° K. whereby a level of liquid helium can be detected using a smaller measuring electric current than in the case of the prior art.

Another object of the present invention is to provide a level gauge which is able to detect a level of liquid helium accomodated in a container under a pressure not smaller than 1.3 bars.

A further object of the present invention is to provide a level gauge which has a sensing element fabricated from superconductive alloys which are fusible at temperatures lower than 1300° C. and which can be produced under production conditions not substantially different from those conditions for conventional alloys by the use of known melting apparatus including quartz nozzles.

A still further object of the present invention is to provide an inexpensive level gauge for liquid helium in which superconductive alloys used as a sensing element of the level gauge comprise expensive noble metal of Ru and Rh in contents lower than known superconductive alloys.

Another object of the invention is to provide a level gauge for liquid helium in which superconductive alloys used as the sensing element have a superconducting transition temperature, Tc, of 4.5° to 5.2° K. whereby the results of measurement become more reduced in error and stabler as the internal pressure in a liquid helium container varies.

In accordance with the present invention, there is provided a level gauge for liquid helium which comprises a sensing element constituted with a wire of a superconductive alloy which has a superconducting transition temperature, Tc, of 4.5° to 5.2° K., a support member for linear support and dielectric insulation of the sensing element thereon, means for energizing the sensing element, and means for detecting a current passed through the sensing element, said superconductive alloy consisting essentially of zirconium, ruthenium and rhodium and being represented by the formula, $$Zr_{100-x}(Ru_{1-y}.Rh_y)_x$$

in which x represents a content of Ru and/or Rh in atomic % and is in the range of $17.0 \leq X \leq 22.5$ and y is a value of $0 \leq y \leq 1$, said superconductive alloy being made of an amorphous phase which is obtained by rapid quenching of a molten alloy material.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts and wherein.

DETAILED DESCRIPTION OF THE PREFERRED EMBODIMENTS

One of the prominent features of the invention resides in that the materials used for a sensing element for detecting a level of liquid helium are superconductive alloys whose superconducting transition temperature, Tc, is from 4.5° to 5.2° K. which is almost equal to a temperature of liquid helium under a pressure higher than 1.3 bars and which are represented by the formula $Zr_{100-x}(Ru_{1-y}.Rh_y)_x$, in which the contents of Zr, Ru and Rh are based on atomic percent and x and y are determined such as $17.0 \leq x \leq 22.5$ and $0 \leq y \leq 1$, respectively.

Figure 2:
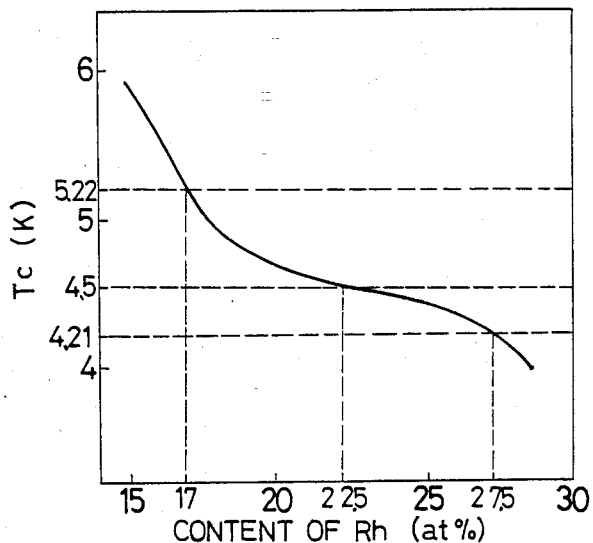
FIG. 2 is a graph showing a variation of superconducting transition temperature, Tc, of Zr-Rh alloys in relation to variation in content of Rh.

Superconductive alloys consisting of Zr and Rh in different mixing ratios are melted and the molten alloys are rapidly quenched and solidified by a single roll method to obtain ribbon wires. These wires are subjected to measurement of superconducting transition temperature, Tc. The relationship between the content of Rh and the superconducting transition temperature, Tc, is shown in FIG. 2.

The superconducting transition temperature, Tc, of the alloys having an Rh content of 22.5 to 27.5 atomic % is in the range of from about 4.2° to 4.5° K. When the content of Rh is further decreased, the transition temperature, Tc, abruptly increases. At the Rh content of 20 atomic %, the transition temperature, Tc, rises to 4.55° K. or higher. On the other hand, when the content of Rh is 15 atomic %, the transition temperature, Tc, increases up to about 6° C. The content of Rh in the alloy corresponding to a transition temperature, Tc of 5.22° K. is found to be about 17 atomic %.

Figure 3:
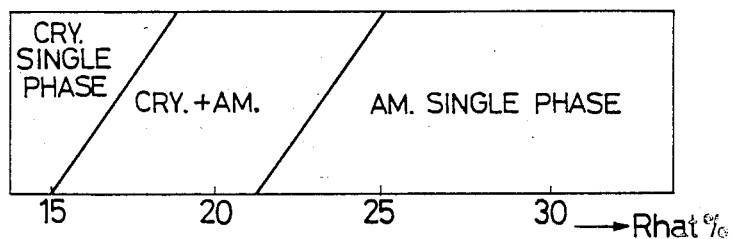
FIG. 3 is a view showing the results of an X-ray analysis of the alloys used with reference to FIG. 2.

The results of the structural analysis of the ribbon wires by X-ray are shown in FIG. 3.

Although some errors may exist depending on the manufacturing conditions of the wires, the alloys having contents of Rh not less than about 23 atomic % result in wires of an amorphous single phase. At Rh contents less than about 17 atomic %, the wires consists of a crystalline phase. When the content of Rh is between the above ranges but up to approximately 20 atomic %, fine crystals considered as $Zr_2Rh$ are dispersed and settled in an amorphous matrix phase. This is why the superconducting trasition temperature, Tc, is higher at a content of Rh less than 20 atomic %.

Figure 1:
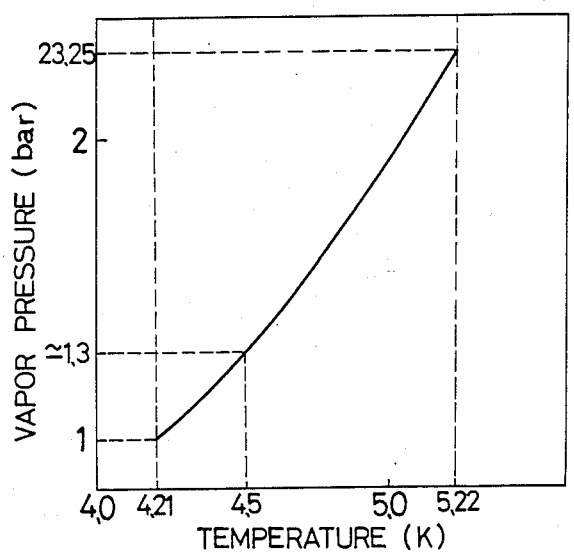
FIG. 1 is a graph showing the relationship between the temperature of liquid helium and the vapor pressure.

From FIGS. 1 and 2, it will be seen that the content of Rh in Zr-Rh alloys which exhibit the superconducting transition at a high pressure of from 1.3 bars to the critical vapor pressure ($\approx 2.3$ bars) and are usable as a level gauge, is in the range of 17 to 22.5 atomic %.

Figure 4:
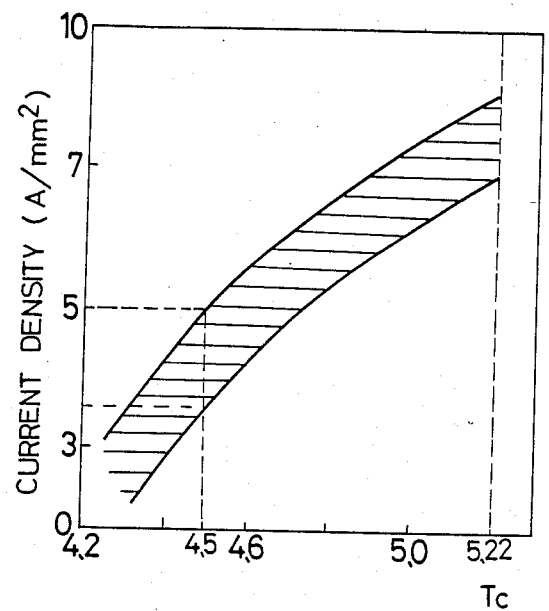
FIG. 4 is a graph showing a current density determined by passing a measuring current through a liquid helium level gauge of the present invention, relative to superconducting transition temperature, Tc.

In case where the ribbon wires of the above superconductive alloys are used for detection of level of liquid helium whose temperature at 1 bar is 4.2° K., the relationship between the current density and the superconducting transition temperature, Tc, of a sensing element of each superconductive alloy wire is shown in FIG. 4. From the figure, it will be seen that when the wire of an amorphous superconductive alloy whose transition temperature, Tc, is 4.5° K. is used as a detector element, an electric current density required to raise the temperature by means of the Joule's heat at a measuring current so as to avoid a level error is from about 3.5 to 5 A/mm². Selection of a measuring current having 3.5 to 5 A/mm² ensures a correct measurement of the level.

Higher transition temperatures, Tc, require a greater measuring current or measuring voltage with an attendant greater consumption of liquid helium. At a maximum transition temperature of 5.2° K., the current density is about 7 A/mm². This enables one to make a low current and low power level gauge using a high resistance wire because thin wires can be fabricated from Zr-Rh and Zr-Ru alloys which have low melting points. For instance, for a current density of 7 A/mm², if a sectional area of a wire is about $7 \times 10^{-3}$ mm², the measuring current can be 50 mA and thus the electric power is 0.3 W at a length of 50 cm. This is much less than a level gauge using a commercially available N-Ti wire which requires a measuring current of approximately 100 mA (several watts).

In order to obtain a wire having a sectional area of $7 \times 10^{-3}$ mm², it is sufficient to make a ribbon having a thickness of 20 microns and a width of 0.35 mm. This type of ribbon can readily be made by a single roll method. Accordingly, ribbons having a high superconducting transition temperature, Tc, can be used for detecting the level of liquid helium.

Even though the pressure and temperature of liquid helium accomodated in a container raise, the level can be measured by adjustment of a measuring current provided that the temperature does not exceed the superconducting transition temperature of the alloy used.

For instance, a ribbon made from a Zr-Rh alloy having an Rh content of 19 atomic % has a transition temperature, Tc, of about 4.7° K. and can be used to measure liquid helium of which vapor pressure is increased to 1.5 bars. At pressures over 1.3 bars, the decrease of a measuring current is required.

Alloys consist of Zr and Ru tend to have a higher superconducting transition temperature by about 0.05° to 0.1° K. than alloys consist of Zr and Rh, but similar results are obtained and thus these alloys may be likewise used in the practice of the invention. In addition, alloys consist of Zr, Ru and Rh have intermediate characteristics and can thus be used.

The alloys of the formula, $Zr_{100-x}(Ru_{1-y}Rh_y)_x$ (in which $17 \leq x \leq 22.5$ by atomic %) have the following advantages when used to make sensing elements.

(1) The superconducting transition temperature, Tc, is in the range of 4.5° to 5.2° K.

(2) The alloys of Zr to which Ru and/or Rh is added have an eutectic point between 24 and 26 atomic %, so that the melting point of the alloy is lower than substantially 1400° C. with the content of Ru and/or Rh being 17.0 atomic %. Accordingly, these alloy can be readily produced in known melting devices equipped with a quartz nozzle.

(3) Wires of alloys in which the content of Ru or Rh is from 20 to 22.5 atomic % comprises a mixed phase structure of amorphous and fine crystalline phases. The mechanical characteristics of these wires do not substantially lower. When the wires are bent at 180°, no breakage takes place. The wires are hard and tough. Accordingly, a fine wire having a width of less than 0.5 mm can be produced and assembled in a level gauge.

Figure 9:
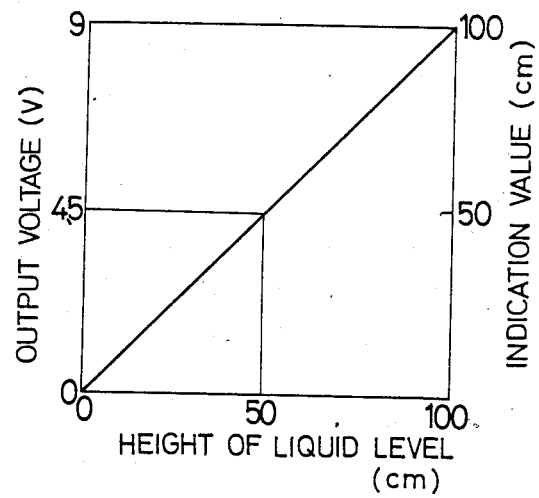
FIG. 9 is a graph showing the relationship between output voltage from an electric circuit and liquid level on measurement of a level of liquid helium using a level gauge according to the present invention.
Figure 5:
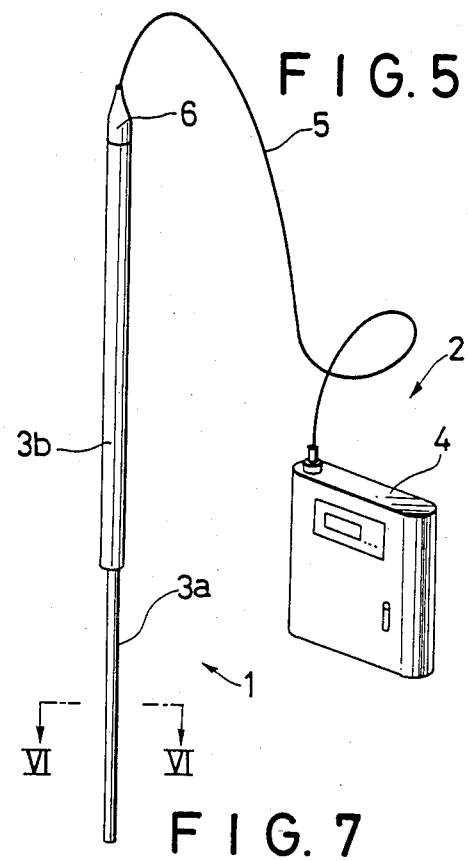
FIG. 5 is a schematic perspective view of one embodiment according to the present invention.
Figure 6:
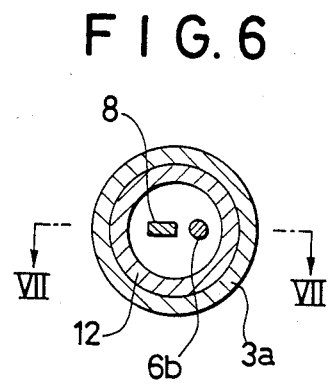
FIG. 6 is a sectional view taken along the line VI—VI of FIG. 5.
Figure 7:
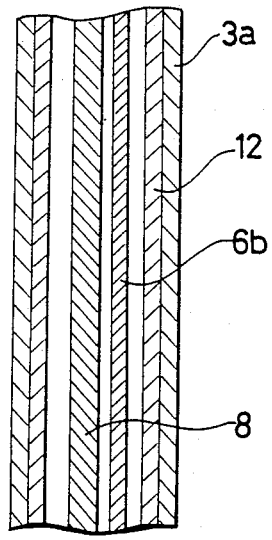
FIG. 7 is a sectional view taken along the line VII—VII of FIG. 6.
Figure 8:
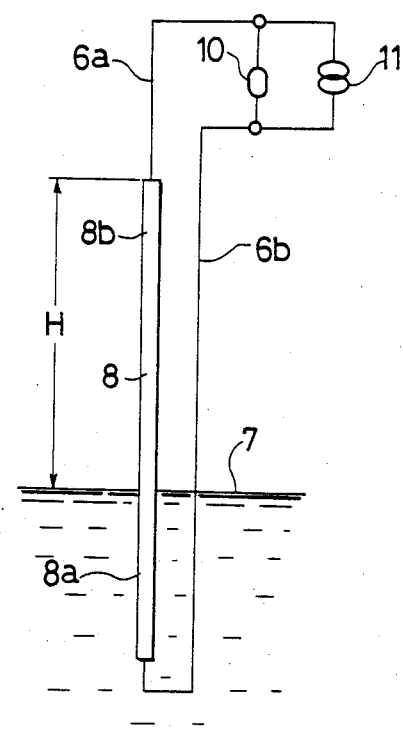
FIG. 8 is an electric circuit used in the embodiment of FIG. 5.

FIGS. 5 to 7 show an embodiment of a level gauge for liquid helium according to the present invention and FIG. 8 is an electric circuit of the embodiment. FIG. 9 is a graph showing the relation between the voltage detected by the electric circuit and the level of liquid helium.

In FIG. 8, indicated by 8 is a ribbon-shaped sensing element made of a superconductive alloys according to the present invention which comprises 20 atomic % of Rh. The sensing element has a thickness of 19 μm and a width of 0.3 mm, and a superconducting transition temperature, Tc, of 4.65° K. and a specific resistance of 165 μ ohms-cm. The element is supported linearly on a support member as will be described hereinafter. The sensing element 8 is connected at opposite ends thereof with electrical conductive wires 6a, 6b, each having an insulative covering. The other ends of the wires 6a, 6b are connected to a DC power circuit 11 comprising a battery, so that the sensing element 8 can be supplied with an electric current from one side to the other along the length thereof. Indicated by 10 is a voltmeter which is connected in parallel to the sensing element 8 with respect to the power circuit 11.

When an electric current of 30 mA is supplied to the sensing element 8 from the power circuit 11, the voltmeter indicates a low voltage because of the great resistance of the sensing element 8. On the other hand, when part or an entirety of the sensing element 8 is inserted into liquid helium accomodated in a container (not shown), the portion of the sensing element 8 immersed in the liquid helium suffers the influence of the very low temperature of the liquid helium, so that the temperature of the portion lowers to below the superconducting transition temperature, Tc, with the remainder having a temperature not less than the transition temperature, Tc. If a level of the liquid helium is indicated as reference numeral 7 in FIG. 8 and the sensing element is held vertical with respect to the level 7 of liquid helium, a portion 8a of the sensing element 8 below the level 7 of the liquid helium has a zero electric resistance of the superconductive alloy, with the result that the voltage indicated by the voltmeter 10 is a value proportional to an electric resistance of the superconductive alloy constituting a portion 8b which is exposed to a helium gas provided above the liquid level 7. Since the sensing element 8 is in the form of a ribbon wire having a predetermined thickness and width, a voltage indicated on the voltmeter 10 is proportional to a length, H, of the portion 8b of the sensing element 8 exposed to the helium gas and provided above the level 7. As a result, a distance ranging from a reference level of the container accomodating the liquid helium therein or the upper end of the sensing element 8 to the level 7 of the liquid helium can be measured. If the liquid helium increases or decreases, the length, H, of the portion 8b of the sensing element 8 varies. This variation is detected as a variation of voltage. When the indication of the voltmeter 10 is numerically converted, it becomes possible to indicate a height of the liquid level 7 from the bottom of the container. For instance, if an indication on the voltmeter 10 is calibrated to be zero when the overall length of the sensing element 8 is exposed to the helium gas and the sensing element is vertically disposed so that the lower end thereof can reach the bottom of the container, the height of the level of the liquid helium can be directly read from the voltmeter 10 as particularly shown in FIG. 9.

In this case, the consumption power is 0.26 W and non-linearity is below 0.5% FS with an error being within 1%.

FIG. 9 is a display (digital display) obtained by conversion, into numerical values, of the height of an accurate liquid level on the abscissa and the output voltage from the detector on the ordinate. When the pressure in the container was increased, no variation in performance could be observed up to 1.2 bars. Because the current was changed to 15 mA over 1 bar, an accurate measurement of liquid level could be made up to bout 1.45 bars.

Reference is again made to FIGS. 5 to 7 which show one embodiment of a level gauge according to the present invention. The level gauge includes a measuring unit 1 and an indication unit 2. The measuring unit 1 includes a support member 3a consisting of a metallic tube and supporting the sensing element 8 and a base member 3b having a larger diameter than the support member 3a. The support member 3a and the base member 3b are coaxially provided and fixedly secured to each other. The support member 3a has a closed lower end. The support member 3a and the base member 3b each has an insulating layer 12 on the inner surface thereof as particularly shown in FIGS. 6 and 7. The support member 3a supports in the inside thereof a linear sensing element 8 through the overall length thereof along the axial directions of the support member 3a. Electrical conductive wires 6a, 6b having an insulative covering, which are connected to opposite ends of the sensing element 8, respectively, and are passed through the measuring unit 1.

One end of the base member 3b of the measuring unit 1 is associated with a connector 6. A power unit 11 and a voltmeter 10 are disposed in a casing 4 of the indication unit 2. The conductive wires 6a, 6b connected to the sensing element 8 at opposite sides thereof are connected to the power circuit 11 and the voltmeter 10 as shown in FIG. 8, through an electric cable 5 for connecting the connector 6 and the casing 4. The measuring unit 1 is arranged to have, for example 290 ohms.

In operation, the measuring unit 1 is attached to an opening of a container accomodating liquid helium therein in such a way that the axis of the measuring unit 1 is arranged vertical to the liquid level of the liquid helium and the support member 3a of the measuring unit 1 is immersed in the liquid helium.

What is claimed as new and desired to be secured by Letters Patent of the United States is:

1. A level gauge for liquid helium comprising:
    a sensing element comprising a wire of a superconductive alloy which has a superconducting transition temperature, Tc, of 4.5° to 5.2° K.;
    a support member for linearly supporting and dielectrically insulating said sensing element;
    means for energizing said sensing element; and
    means for detecting a current passed through the sensing element,
    said superconductive alloy consisting essentially of zirconium, ruthenium and rhodium and represented by the formula, $Zr_{100-x}(Ru_{1-y}Rh_y)_x$ in which x represents a content of at least one of said ruthenium and said rhodium in atomic % and in a numerical value of $17.0 \leq x \leq 22.5$ and y represents a numerical value of $0 \leq y \leq 1$, said superconductive alloy having an amorphous phase which is obtained by rapid quenching of a molten alloy material.

2. A superconductive alloy for use in a sensing element for a level gauge capable of detecting a level of liquid helium, said alloy consisting essentially of zirconium, ruthenium and rhodium and represented by the formula, $Zr_{100-x}(Ru_{1-y}Rh_y)_x$ in which x represents a content of at least one of said ruthenium and said rhodium in atomic % and in a numerical value of $17.0 \leq x \leq 22.5$ and y represents a numerical value of $0 \leq y \leq 1$, said superconductive alloy having an amorphous phase which is obtained by rapid quenching of a molten alloy material and having a superconducting transition temperature, Tc, of 4.5° to 5.2° K.

* * * * *

UNITED STATES PATENT AND TRADEMARK OFFICE
CERTIFICATE OF CORRECTION

PATENT NO. : 4,745,806

DATED : May 24, 1988

INVENTOR(S) : Masumoto et al.

It is certified that error appears in the above-identified patent and that said Letters Patent is hereby corrected as shown below:

Title page:

In [30], insert --Foreign Application Priority Data Jan. 29, 1985 [JP]   Japan .............. 85 016242--.

In the Abstract, line 7, delete "are" and insert --is--;

In the Abstract, line 10, after "value of" insert --0--.

In column 1, line 7, delete "accomodated" and insert --accommodated--;

In column 1, line 42, delete "accomodated" and insert --accommodated-;

In column 1, line 68, after "formula," insert -- $Zr_{100-x}(Ru_y \cdot Rh_{1-y})_x$ --;

In column 2, line 18, delete "accomodating" and insert --accommodating--;

In column 2, line 30, delete "of" and insert --to--;

In column 2, line 42, delete "accomodated" and insert --accommodated--;

In column 4, line 17, delete "the" and insert --using--;

UNITED STATES PATENT AND TRADEMARK OFFICE
CERTIFICATE OF CORRECTION

PATENT NO. : 4,745,806
DATED : May 24, 1988
INVENTOR(S) : Masumoto et al.

It is certified that error appears in the above-identified patent and that said Letters Patent is hereby corrected as shown below:

In column 4, line 19, delete "result" and insert --results--;

In column 4, line 20, delete "consists" and insert --consist--;

In column 4, line 25, delete "trasition" and insert --transition--;

In column 4, line 32, delete "case" and insert --cases--;

In column 5, line 2, delete "accomodated" and insert --accommodated";

In column 5, line 2, delete "raise" and insert --rise--;

In column 5, line 12, delete "consist" and insert --consisting--;

In column 5, line 14, delete "consist" and insert --consisting--;

In column 5, line 17, delete "consist" and insert --consisting--;

UNITED STATES PATENT AND TRADEMARK OFFICE
CERTIFICATE OF CORRECTION

PATENT NO. : 4,745,806

DATED : May 24, 1988

INVENTOR(S) : Masumoto et al.

It is certified that error appears in the above-identified patent and that said Letters Patent is hereby corrected as shown below:

In column 5, line 28, delete "alloy" and insert --alloys--;

In column 5, line 46, delete "alloys" and insert --alloy--;

In column 5, line 67, delete "accomodated" and insert --accommodated--;

In column 6, line 22, delete "accomodating" and insert --accommodating--;

In column 6, line 49, delete "bout" and insert --about--;

In column 6, line 67, delete "having an insulated covering,";

In column 7, line 1, after "respectively," insert --having an insulated covering,--;

In column 7, line 13, delete "accomodating" and insert --accommodating--;

In column 7, line 15, delete "vertical" and insert --vertically--;

UNITED STATES PATENT AND TRADEMARK OFFICE
CERTIFICATE OF CORRECTION

PATENT NO. : 4,745,806

DATED : May 24, 1988

INVENTOR(S) : Masumoto et al.

It is certified that error appears in the above-identified patent and that said Letters Patent is hereby corrected as shown below:

In column 8, lines 19 and 20, delete "$17.0 \times h \leq 22.5$" and insert --$17.0 \leq x \leq 22.5$--.

Signed and Sealed this

Twenty-first Day of February, 1989

*Attest:*

DONALD J. QUIGG

*Attesting Officer*  *Commissioner of Patents and Trademarks*